United States Patent
Imai et al.

(10) Patent No.: US 11,422,287 B2
(45) Date of Patent: Aug. 23, 2022

(54) PLASTIC SPECTACLE LENS AND SPECTACLES

(71) Applicant: TOKAI OPTICAL CO., LTD., Okazaki (JP)

(72) Inventors: Koji Imai, Okazaki (JP); Hiroshi Ueno, Okazaki (JP); Hirotoshi Takahashi, Okazaki (JP)

(73) Assignee: Tokai Optical Co., Ltd., Okazaki (JP)

( * ) Notice: Subject to any disclaimer, the term of this patent is extended or adjusted under 35 U.S.C. 154(b) by 205 days.

(21) Appl. No.: 16/542,755

(22) Filed: Aug. 16, 2019

(65) Prior Publication Data
US 2019/0369291 A1  Dec. 5, 2019

Related U.S. Application Data

(63) Continuation of application No. PCT/JP2018/004456, filed on Feb. 8, 2018.

(30) Foreign Application Priority Data

Feb. 27, 2017 (JP) .............................. JP2017-035269

(51) Int. Cl.
  *G02B 1/04* (2006.01)
  *G02B 1/14* (2015.01)
  *G02B 1/115* (2015.01)
  *G02C 7/02* (2006.01)

(52) U.S. Cl.
  CPC ............... *G02B 1/041* (2013.01); *G02B 1/14* (2015.01); *G02B 1/115* (2013.01); *G02C 7/02* (2013.01)

(58) Field of Classification Search
  CPC .......... G02B 1/041; G02B 1/14; G02B 1/115; G02C 7/02; G02C 7/104
  See application file for complete search history.

(56) References Cited

U.S. PATENT DOCUMENTS

| | | | |
|---|---|---|---|
| 9,022,585 | B2 | 5/2015 | Ogo et al. |
| 2010/0003508 | A1 | 1/2010 | Arrouy et al. |
| 2010/0041787 | A1 | 2/2010 | Chen |
| 2010/0238540 | A1 | 9/2010 | Miyakawa |

(Continued)

FOREIGN PATENT DOCUMENTS

| | | |
|---|---|---|
| CN | 103992672 B | 1/2017 |
| EP | 3 070 515 A1 | 9/2016 |

(Continued)

OTHER PUBLICATIONS

Chinese Office Action (Application No. 201880013278.9) dated Oct. 30, 2020 (with English translation).

(Continued)

*Primary Examiner* — Darryl J Collins
*Assistant Examiner* — Matthew Y Lee
(74) *Attorney, Agent, or Firm* — Burr & Brown, PLLC

(57) ABSTRACT

A plastic spectacle lens includes at least a plastic base. In the plastic spectacle lens, a difference between a highest transmittance and a lowest transmittance for light in a range of wavelengths of not less than 400 nm and not greater than 780 nm, is not greater than 10 points, and an internal transmittance of the base for light in a range (visible range) of wavelengths of not less than 380 nm and not greater than 780 nm is not less than 80% over the entirety of the range of the wavelengths.

4 Claims, 9 Drawing Sheets

(56) References Cited

U.S. PATENT DOCUMENTS

| | | | |
|---|---|---|---|
| 2010/0279088 A1* | 11/2010 | Naito | C08L 75/04 |
| | | | 428/327 |
| 2013/0321914 A1 | 12/2013 | Mizuno | |
| 2015/0198821 A1* | 7/2015 | Miyamoto | G02B 5/0816 |
| | | | 351/159.62 |
| 2016/0318287 A1 | 11/2016 | Chen-Ho et al. | |
| 2017/0227681 A1* | 8/2017 | Maury | G02B 5/008 |
| 2018/0067339 A1* | 3/2018 | Miyamoto | G02C 7/104 |

FOREIGN PATENT DOCUMENTS

| | | |
|---|---|---|
| JP | S51-075533 A1 | 6/1976 |
| JP | S63-008703 A1 | 1/1988 |
| JP | H08-292309 A1 | 11/1996 |
| JP | H10-081716 A1 | 3/1998 |
| JP | 3477723 B2 | 12/2003 |
| JP | 2005-338366 A1 | 12/2005 |
| JP | 2009-092949 A1 | 4/2009 |
| JP | 2013-238634 A1 | 11/2013 |
| JP | 2015-191147 A1 | 11/2015 |
| WO | 2009/038134 A1 | 3/2009 |
| WO | 2012/133216 A1 | 10/2012 |
| WO | 2015/095123 A1 | 6/2015 |

OTHER PUBLICATIONS

Extended European Search Report (Application No. 18756767.2) dated Nov. 26, 2020.
Chen Heng, "Infrared Physics," National Defense Industry Press, Oct. 1985, pp. 76-80 (English translation of relevant parts only).
Chinese Office Action (Application No. 201880013278.9) dated Apr. 9, 2020 (with English translation).
International Search Report and Written Opinion (Application No. PCT/JP2018/004456) dated May 1, 2018.

* cited by examiner

PLASTIC SPECTACLE LENS AND SPECTACLES

This application is a Continuation of International Application No. PCT/JP2018/004456, filed on Feb. 8, 2018, which claims the benefit of Japanese Patent Application Number 2017-035269 filed on Feb. 27, 2017, the disclosures of which are incorporated by reference herein in their entireties.

BACKGROUND OF INVENTION

Field of the Invention

The present invention relates to a plastic spectacle lens (including a sunglass lens), and spectacles (including sunglasses) using the plastic spectacle lenses.

Background of the Invention

To date, a plastic spectacle lens has been formed by an ultraviolet absorber described in Japanese Patent No. 3477723 being added to a polymerizable composition such that light having a wavelength of not less than 300 nm (nanometer) and less than 400 nm is absorbed, and a transmittance of the light in a range of the wavelengths is about 10% or less, from the viewpoint of protecting eyes and preventing degradation of the lens.

Meanwhile, a glass spectacle lens having a transmittance of about 80% for light having a wavelength of 380 nm as described in Japanese Laid-Open Patent Publication No. 2005-338366 is known.

SUMMARY OF THE INVENTION

Problems to be Solved by the Invention

It is considered that the lower limit (short wavelength limit) of wavelengths of visible light, that is, light which is visible to human eyes is in a range of wavelengths of not less than 360 nm and not greater than 400 nm, and the upper limit (long wavelength limit) of the wavelengths thereof is in a range of wavelengths of not less than 760 nm and not greater than 830 nm. The plastic spectacle lens disclosed in Japanese Patent No. 3477723 absorbs light having a wavelength of not greater than 400 nm, and light in the wavelength range does not reach eyes. When light including light in the wavelength range is viewed through the spectacle lens (in an equipped state), a color is recognized as a color different from a color which is viewed in a state where the light does not pass through the spectacle lens (viewed with naked eyes). Thus, if a color viewed through the spectacle lens is varied, when importance is placed on a color in, for example, fashion designers' use, interior designers' use, or product designers' use, it is difficult to use the spectacle lens disclosed in Japanese Patent No. 3477723.

The glass spectacle lens disclosed in Japanese Laid-Open Patent Publication No. 2005-338366 has a transmittance of about 80% for light having a wavelength of 380 nm. Thus, as compared to the spectacle lens disclosed in Japanese Patent No. 3477723, a color viewed in an equipped state is approximate to a color viewed with naked eyes. However, for example, attention needs to be paid to the lens, which is made of glass, in order to prevent the lens from being dropped and broken, or the weight becomes relatively great, and, therefore, handleability and comfortability in an equipped state are degraded.

Therefore, a main object of the present invention is to provide a plastic spectacle lens and spectacles that have a high transmittance in a range of wavelengths of visible light, that is, over almost the entirety of the visible range, allow a color in an equipped state to be recognized as a color similar to a color viewed with naked eyes with an extremely small change in color in the equipped state, and provide excellent handleability and comfortability.

Solution to the Problems

In order to attain the aforementioned object, a first aspect is directed to a plastic spectacle lens including a plastic base, and a difference between a highest transmittance and a lowest transmittance for light in a range of wavelengths of not less than 400 nm and not greater than 780 nm, is not greater than 10 points, and an internal transmittance of the base for light in a range of wavelengths of not less than 380 nm and not greater than 780 nm is not less than 80% over the entirety of the range of the wavelengths.

Another aspect based on the aforementioned invention, a hard coating layer is formed on at least one surface of the base.

Another aspect based on the aforementioned invention, particles of a metal oxide are added to the hard coating layer, and the metal oxide is an oxide of one or more kinds of metals other than Ti and Ce.

Another aspect based on the aforementioned invention, an antireflection film is formed on at least one surface of the base.

Another aspect based on the aforementioned invention, an ultraviolet absorber is added to the base.

Another aspect based on the aforementioned invention, an absolute value of a difference between a hue angle of a color of light in a case where the light does not pass through the plastic spectacle lens and a hue angle of a color of the light in a case where the light is transmitted through the plastic spectacle lens, is less than 1.

Another aspect is directed to spectacles comprising the plastic spectacle lens according to the aforementioned inventions.

Advantageous Effects of the Invention

A principal effect of the present invention is to provide a plastic spectacle lens and spectacles that have a high transmittance in a range of wavelengths of visible light, that is, over almost the entirety of visible range, allow a color in an equipped state to be recognized as a color similar to a color viewed with naked eyes with an extremely small change in color in the equipped state, and provide excellent handleability and comfortability.

DETAILED DESCRIPTION OF THE INVENTION

Figure 1:
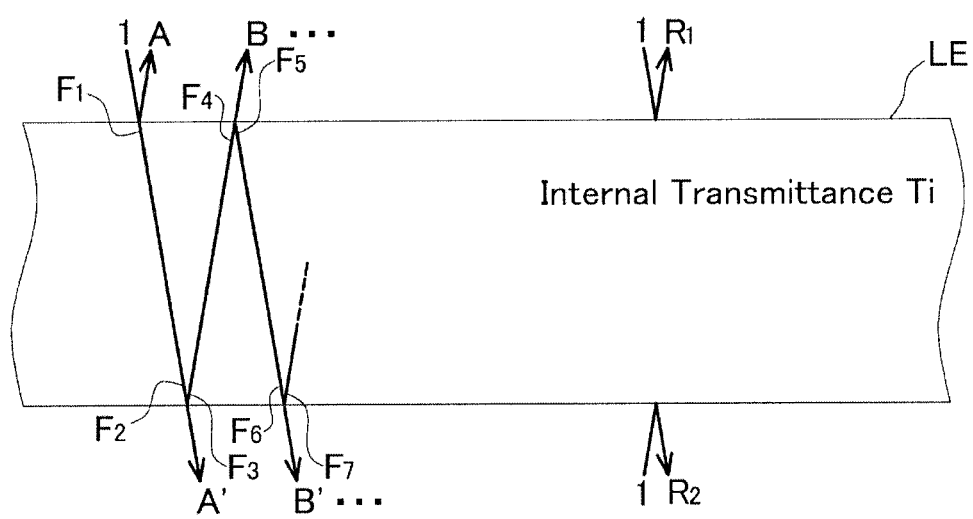
FIG. 1 is a schematic diagram illustrating a relationship among reflected light, transmitted light, and an internal transmittance in consideration of light incident on a base, absorption, and reflection on both surfaces.

An exemplary embodiment of the present invention will be described below. The present invention is not limited to the embodiment described below.

A plastic spectacle lens according to the present invention includes at least a plastic base.

In the plastic spectacle lens, a difference between the highest transmittance and the lowest transmittance of light in a range of wavelengths of not less than 400 nm and not greater than 780 nm is not greater than 10 points, and an internal transmittance of the base for light in a range of wavelengths (visible range) of not less than 380 nm and not greater than 780 nm is not less than 80% over the entire range.

As described above, the visible range is a range of wavelengths from the short wavelength limit to the long wavelength limit. In the description herein, the visible range is a range of wavelengths of not less than 380 nm and not greater than 780 nm.

As a material of the base, a thermosetting resin is preferably used. Examples of the thermosetting resin include polyurethane resin, thiourethane resin, urethane-urea resin, episulfide resin, polycarbonate resin, polyester resin, acrylic resin, polyether sulfone resin, poly(4-methylpentene-1) resin, diethylene glycol bis(allyl carbonate) resin, and a combination thereof.

An ultraviolet absorber is preferably added to the base, and an ultraviolet absorber having an absorption peak wavelength of less than 380 nm is more preferably added to the base, from the viewpoint of protecting eyes and preventing degradation of the lens while assuring reproducibility of colors viewed with naked eyes. An amount of such an ultraviolet absorber to be added is adjusted from the above-described viewpoint.

The thickness of the base is not particularly limited when the above-described condition of the internal transmittance and the condition of the transmittance of the lens are assured. However, the thickness is preferably not greater than 4 mm (millimeter) since the internal transmittance proportionally increases and an outer appearance as spectacle lens and the weight thereof become relatively unfavorable, according to the thickness being increased.

The plastic spectacle lens may be formed merely from the base. However, a hard coating layer may be formed on at least one surface of the base.

The hard coating layer is preferably formed by hard coating solution being uniformly applied on the surface of the base.

For the hard coating layer, an organosiloxane resin containing inorganic oxide particles may be preferably used. An organosiloxane resin obtained by hydrolyzing and condensing an alkoxysilane is preferred as the organosiloxane resin. Specific examples of the organosiloxane resin include γ-glycidoxypropyltrimethoxysilane, γ-glycidoxypropyltriethoxysilane, methyl trimethoxysilane, ethyl silicate, and a combination thereof. The hydrolysis condensates of the alkoxysilanes are produced by hydrolyzing an alkoxysilane compound or a combination of the compounds by an acidic aqueous solution such as hydrochloric acid.

Meanwhile, specific examples of a material of the inorganic oxide particles include a sol of each of zinc oxide, silicon dioxide (silica particulates), aluminum oxide, titanium oxide (titania particulates), zirconium oxide (zirconia particulates), tin oxide, beryllium oxide, antimony oxide, tungsten oxide, and cerium oxide, and mixed crystals of two or more of the sols. The diameter of the inorganic oxide particle is preferably not less than 1 nm and preferably not greater than 100 nm, and more preferably not less than 1 nm and more preferably not greater than 50 nm from the viewpoint of assuring transparency of the hard coating layer. An amount (concentration) of the inorganic oxide particles to be blended is preferably not less than 40% by weight (weight percent) of all the components of the hard coating layer and preferably not greater than 60% by weight thereof from the viewpoint of assuring appropriate levels of hardness and toughness of the hard coating layer. In addition, the hard coating solution may contain at least one of an acetylacetone metal salt and an ethylenediaminetetraacetic acid metal salt, or the like, as a curing catalyst. Furthermore, the hard coating solution may contain a surfactant, a colorant, a solvent, or the like, as necessary for, for example, assuring adhesion to the base, facilitating formation, and coloring with a desired (semi)transparent color.

An inorganic oxide that performs little absorption in the visible range is selected as an inorganic oxide (metal oxide) of the inorganic oxide particles, and the inorganic oxide is preferably an oxide of one or more kinds of metals other than Ti and Ce, from the viewpoint of assuring a high transmittance over the entirety of the visible range, and assuring a substantially small difference of a color viewed through the lens from a color viewed with naked eyes. Light in the visible range (in particular, on the short wavelength side) is absorbed by an oxide of Ti (titanium) and an oxide of Ce (cerium), and oxides of the Ti and Ce are excluded from preferable metal oxides. Preferable examples of the metal oxide include oxides of Sb (antimony), Sn (tin), Si (silicon), Al (aluminium), Ta (tantalum), La (lanthanum), Fe (iron), Zn (zinc), W (tungsten), Zr (zirconium), and In (indium), and a combination thereof.

The hard coating layer preferably has a physical film thickness of not less than 0.5 μm (micrometer) and not greater than 4.0 μm. The lower limit in the film thickness range is determined since it is difficult to obtain a sufficient hardness if the film thickness is less than the lower limit. Meanwhile, the upper limit therein is determined since a possibility of causing a problem with physical properties such as generation of crack or fragility is significantly increased, or influence of the inorganic oxide particles on absorption of light in the visible range (lowering transmittance) is increased if the film thickness is greater than the upper limit.

Moreover, a primer film may be added between the hard coating layer and the surface of the base, from the viewpoint of improving adhesion of the hard coating layer. Examples of a material of the primer film include polyurethane-based resin, acrylic resin, methacrylic resin, organosilicon resin, and a combination thereof. The primer film is preferably formed by primer solution being uniformly applied on the surface of the base. The primer solution is a solution in which the resin material and the inorganic oxide particles are mixed in water or alcohol-based solvent.

An optical multilayer film may be added to the plastic spectacle lens. The optical multilayer film may be formed on the base. However, the optical multilayer film is preferably formed on the hard coating layer. The optical multilayer film is formed on at least one of surfaces of the base. When the optical multilayer films are formed on both the surfaces, the optical multilayer films preferably have the same layered structure.

The optical multilayer film is preferably formed so as to have a distribution of high transmittances that are uniform over the entirety of the visible range, or preferably formed by using a material such as zirconium oxide (zirconia) which performs little absorption in the visible range without using a material such as a titanium oxide layer which performs absorption in the visible range, from the viewpoint of assuring that a color viewed through the lens is similar to a color viewed with naked eyes.

The optical multilayer film is preferably formed by low refractive index layers and high refractive index layers being alternately layered, and preferably has a structure in which the total number of the layers is an odd number (five layers in total, seven layers in total, or the like) from the viewpoint of assuring a reflection prevention function (antireflection film). More preferably, when a nearest layer (layer closest to the base) to the base is a first layer, odd layers are low refractive index layers and even layers are high refractive index layers.

The low refractive index layer and the high refractive index layer are formed by a vacuum deposition method, an ion assisted deposition method, an ion plating method, a sputtering method, or the like.

In the plastic spectacle lens of the present invention, another kind of film such as an intermediate film or an antifouling film (water repellent film-oil repellent film) other than the hard coating layer may be added between the optical multilayer film and the base and on at least one of surfaces of the optical multilayer film. When the optical multilayer films are formed on both surfaces, kinds of the other kinds of films to be added may be changed between the surfaces or presence or absence of the film may be changed therebetween.

The absolute value of a difference between a hue angle of a color of light which does not pass through the plastic spectacle lens according to the present invention and a hue angle of a color obtained when light of the color is transmitted through the plastic spectacle lens is preferably less than 1, from the viewpoint of assuring a substantially small difference of a color viewed through the lens from a color viewed with naked eyes.

The colors of light that does not pass through the plastic spectacle lens are preferably colors that typify almost the entirety of the visible range. Examples of the color includes a combination of two colors that are blue and red, a combination of three colors that are blue, green, and red, a combination of four colors that are blue, green, yellow, and red, a combination of five colors that are blue, light blue, green, yellow, and red, a combination of six colors that are blue, light blue, green, yellow, orange, and red, a combination of six colors that are purple, blue, light blue, green, yellow, and red, and a combination of seven colors that are purple, blue, light blue, green, yellow, orange, and red.

Spectacles are produced by using the plastic spectacle lens described above such that the spectacles have a high transmittance over almost the entirety of the visible range, allow a color viewed in an equipped state to be recognized as a color similar to a color viewed with naked eyes with an extremely small change in color in the equipped state, and provide excellent handleability and comfortability.

EXAMPLES

Next, examples 1 to 3 of the present invention and comparative examples 1 to 6 which do not belong to the present invention will be described with reference where appropriate to the drawings. The present invention is not limited to the examples described below. Furthermore, according to interpretation of the present invention, examples may be regarded as comparative examples or comparative examples may be regarded as examples.

<<Base and the Like>>

Each of examples and comparative examples was the plastic spectacle lens, and the base thereof was formed from a thermosetting resin for spectacles, and the plastic spectacle lens had a round shape and a standard size as a plastic spectacle lens.

In examples and comparative examples, two kinds of bases (first base and second base) were formed. The bases were different in a kind and an amount of an ultraviolet absorber in the material.

The first base was a non-spherical lens having a refractive index $n_e$=1.6008 for light having a wavelength of 546 nm, the Abbe number $v_e$=40, the lens center thickness of 1.9 mm, and the power of S-0.00, and was formed in the following manner. In the present invention, the power is variable, and orthoptics is allowed according to a vision of naked eyes of a person who wears the lens.

Specifically, a uniform solution was prepared in which 0.03 parts by weight of dibutyltin dichloride was added as a catalyst to 100 parts by weight of the total of 51 parts by weight of norbornene diisocyanate, 22 parts by weight of pentaerythritol tetrakis(3-mercaptopropionate), and 27 parts by weight of bis(mercaptomethyl)-3,6,9-trithia-1,1,1-undecane diol, and 0.11 parts by weight of an ultraviolet absorber (VSU manufactured by Clariant Chemicals) was also blended thereto. Then, the uniform solution was injected in a mold for a lens, and was cured while the temperature was being increased from 25° C. to 140° C., for 18 hours, to produce the first base.

Example 1 was the plastic spectacle lens formed merely from the first base.

The second base was a non-spherical lens having a refractive index $n_e$=1.6015 for light having a wavelength of 546 nm, the Abbe number $v_e$=40, the lens center thickness of 1.9 mm, and the power of S-0.00, and was formed in the following manner.

Specifically, a uniform solution was prepared in which 0.03 parts by weight of dibutyltin dichloride was added as a catalyst to 100 parts by weight of the total of 51 parts by weight of norbornene diisocyanate, 22 parts by weight of pentaerythritol tetrakis(3-mercaptopropionate), and 27 parts by weight of bis(mercaptomethyl)-3,6,9-trithia-1,1,1-undecane diol, and 2.00 parts by weight of an ultraviolet absorber (T-53 manufactured by Daiwa Fine Chemicals Co., Ltd.) was also blended thereto. Then, the uniform solution was injected in a mold for a lens, and was cured while the temperature was being increased from 25° C. to 140° C., for 18 hours, to produce the second base.

Comparative example 1 was the plastic spectacle lens formed merely from the second base.

<<Hard Coating Layer and the Like>>

In some of examples and comparative examples, hard coating layers formed by hard coating solution being applied were formed as intermediate films on both surfaces.

Two kinds of hard coating layers (first hard coating layer and second hard coating layer) were each formed, as the hard coating layer contacting with the base, by hard coating solution containing metal oxide particles being applied to the base and heated. A part of a material of the hard coating solution and an amount thereof, and a kind and an amount of the metal oxide particles were different between the hard coating layers.

The first hard coating layer was produced in the following manner.

Firstly, 121 parts by weight of methanol was added to 76 parts by weight of γ-glycidoxypropyltrimethoxysilane, and 26 parts by weight of 0.01 N (normality) aqueous hydrochloric acid solution was dropped into the obtained mixture while being stirred under ice cooling to hydrolyze the mixture, and the hydrolyzed mixture was further continuously stirred at 15° C. for one day and night, to produce hard coating base solution.

Next, 261 parts by weight of sol of antimony oxide particles (antimony oxide sol $Sb_2O_5$, ELCOM V-4566 manufactured by JGC Catalysts and Chemicals Ltd.) was added as metal oxide particles to the hard coating base solution (223 parts by weight in total), and 0.60 parts by weight of a silicone-based surfactant (SILWETL-7001 manufactured by NUC Corporation) as a leveling agent, 10.4 of parts by weight of itaconic acid, and 5.3 parts by weight of dicyandiamide were added to the mixture, and, further, the obtained mixture was stirred at 20° C. for one day and night, to produce hard coating solution containing about 30% of solid content.

The first hard coating layer was formed by the hard coating solution being applied and heated, in the following manner.

Specifically, the hard coating solution was applied uniformly over the pre-treated outer surface of the first base by a dipping method (lifting speed was 250 mm/minute), and, further, the first base with the hard coating solution was left as it was for two hours in the environment where the temperature was 110° C., to cure the hard coating layer having the physical film thickness of 2.5 μm (micrometer) and the refractive index $n_e$=1.5912.

Example 2 was the plastic spectacle lens formed merely from the first base and the first hard coating layer.

The second hard coating layer was produced in the following manner.

150 parts by weight of methanol was added to 11 parts by weight of tetraethoxysilane, 76 parts by weight of γ-glycidoxypropyltrimethoxysilane, and 22 parts by weight of γ-glycidoxypropylmethyldiethoxysilane, and 24 parts by weight of 0.01 N (normality) aqueous hydrochloric acid solution was dropped into the obtained mixture while being stirred under ice-cooling to hydrolyze the mixture, and the hydrolyzed mixture was further continuously stirred at 15° C. for one day and night, to produce hard coating base solution.

Next, 192 parts by weight of sol of composite particles of titanium oxide (titanium oxide sol, HINEX AB 20 manufactured by JGC Catalysts and Chemicals Ltd.) was added as the metal oxide particles to the hard coating base solution (283 parts by weight in total), and 0.60 parts by weight of silicone-based surfactant (SILWETL-7001 manufactured by NUC corporation) as a leveling agent, 20.02 parts by weight of itaconic acid, and 8.33 parts by weight of dicyandiamide was added to the mixture, and, further, the obtained mixture was stirred at 20° C. for one day and night, to produce hard coating solution containing about 30% of solid content.

The second hard coating layer was formed by the hard coating solution being applied and heated in the following manner.

Specifically, the hard coating solution was applied uniformly over the pre-treated outer surface of the second base by a dipping method (lifting speed was 250 mm/minute), and, further, the second base with the hard coating solution was left as it was for two hours in the environment where the temperature was 110° C., to cure the hard coating layer having the physical film thickness of 2.5 μm and the refractive index $n_e$=1.6004.

Comparative example 2 was the plastic spectacle lens formed merely from the first base and the second hard coating layer.

<<Optical Multilayer Film and the Like>>

Furthermore, in some of examples and comparative examples, optical multilayer films having the same structure on each surface were formed on the hard coating layers on both surfaces.

Three kinds of the optical multilayer films (first optical multilayer film to third optical multilayer film) were formed.

The total number of layers was different between the first optical multilayer film and the second optical multilayer film, and the physical film thickness was different on each layer.

The second optical multilayer film and the third optical multilayer film had different high refractive index materials and the physical film thickness was different on each layer.

The first optical multilayer film was formed such that five layers were formed in total on each surface of the base with the hard coating layer as alternately layered films (antireflection film) having low refractive index layers (which were odd layers L1, L3, and L5 in which the layer closest to the base was the first layer L1) and high refractive index layers (even layers L2 and L4).

In the first optical multilayer film, the low refractive index layer was formed from a low refractive index material. In the description herein, the low refractive index material was $SiO_2$ ($SiO_2$ manufactured by Canon Optron Inc.), and the low refractive index layer was a $SiO_2$ layer. Meanwhile, the high refractive index layer was formed from a high refractive index material. In the description herein, the high refractive index material was $ZrO_2$ ($ZrO_2$ manufactured by Canon Optron Inc.), and the high refractive index layer was a $ZrO_2$ layer.

The physical film thickness, the refractive index for light having a wavelength of 500 nm, and the like for each layer in the first optical multilayer film are indicated in the following [Table 1].

The first optical multilayer film was formed as follows. Specifically, the base with the hard coating layer was put in a vacuum chamber in a state where one (surface on which the first optical multilayer film was to be formed) of surfaces faced downward, and the base with the hard coating layer was heated so as to be maintained for 10 minutes in an atmosphere in which the temperature was 80° C. Thereafter, the low refractive index materials and the high refractive index materials were alternately deposited in a state where the low refractive index materials and the high refractive index materials were disposed below the base under a vacuum condition in which the vacuum pressure was 7.0×10$^{-4}$ Pa (pascal), to form five dielectric multilayer films (antireflection film) in total on the one of the surfaces. Thereafter, water-repellent treatment was performed on the surface on which the antireflection film was formed. Furthermore, an antireflection film having the same structure and having the outermost surface to which a water-repellent layer (L6) was adhered was similarly formed on the other of the surfaces of the base with the hard coating layer. The water-repellent layer may be considered as a constituent of the antireflection film, or may not be considered as a constituent included in the antireflection film.

Example 3 was the plastic spectacle lens formed from the first base, the first hard coating layer, and this first antireflection film.

TABLE 1

| Base side | Layer | Material | Refractive index (wavelength 500 nm) | Film thickness (nm) |
|---|---|---|---|---|
| Antireflection film | First layer | SiO$_2$ | 1.4780 | 193.60 |
| | Second layer | ZrO$_2$ | 2.1246 | 19.30 |
| | Third layer | SiO$_2$ | 1.4780 | 46.90 |
| | Fourth layer | ZrO$_2$ | 2.1246 | 26.60 |
| | Fifth layer | SiO2 | 1.4780 | 105.60 |
| Water-repellent layer | | | Provided | |

The second optical multilayer film was formed such that standard seven layers were formed in total on each surface of the base with the hard coating layer in an almost similar manner to that for the first optical multilayer film as alternately layered films (antireflection film) having low refractive index layers (which were odd layers L1, L3, L5, and L7 in which the layer closest to the base was the first layer L1), and high refractive index layers (even layers L2, L4, and L6), and, further, a water-repellent layer (L8) was added.

The physical film thickness, the refractive index for light having a wavelength of 500 nm, and the like for each layer in the second optical multilayer film are indicated in the following [Table 2].

Comparative example 3 was the plastic spectacle lens formed from the second base, the second hard coating layer, and this second antireflection film.

Comparative example 4 was the plastic spectacle lens formed from the first base, the first hard coating layer, and the second optical multilayer film.

TABLE 2

| Base side | Layer | Material | Refractive index (wavelength 500 nm) | Film thickness (nm) |
|---|---|---|---|---|
| Antireflection film | First layer | SiO$_2$ | 1.4780 | 28.00 |
| | Second layer | ZrO$_2$ | 2.1246 | 7.30 |

TABLE 2-continued

| Base side | Layer | Material | Refractive index (wavelength 500 nm) | Film thickness (nm) |
|---|---|---|---|---|
| | Third layer | SiO$_2$ | 1.4780 | 174.20 |
| | Fourth layer | ZrO$_2$ | 2.1246 | 32.20 |
| | Fifth layer | SiO$_2$ | 1.4780 | 21.00 |
| | Sixth layer | ZrO$_2$ | 2.1246 | 54.10 |
| | Seventh layer | SiO$_2$ | 1.4780 | 89.50 |
| Water-repellent layer | | | Provided | |

The third optical multilayer film was formed such that standard seven layers were formed in total on each surface of the base with the hard coating layer in an almost similar manner to that for the first optical multilayer film as alternately layered films (antireflection film) having low refractive index layers (which were odd layers L1, L3, L5, and L7 in which the layer closest to the base was the first layer L1), and high refractive index layers (even layers L2, L4, and L6), and, further, the water-repellent layer (L8) was added.

The high refractive index material of the third optical multilayer film was Ti$_3$O$_5$ (OS-50 manufactured by Canon Optron Inc.), and oxygen gas was introduced into a vacuum chamber during deposition to cause the following reaction, thereby forming a TiO$_2$ layer as the high refractive index layer. The value of x in the following expression may be less than 2 (not less than 5/3) according to, for example, an amount of oxygen gas to be introduced and a pressure in the vacuum chamber at the introduction of the oxygen gas.

$$Ti_3O_5 + \delta O_2 \rightarrow TiO_x \ (x=2)$$

The physical film thickness, the refractive index for light having a wavelength of 500 nm, and the like for each layer of the third optical multilayer film are indicated in the following [Table 3].

Comparative example 5 was the plastic spectacle lens formed from the first base, the first hard coating layer, and this third antireflection film.

Comparative example 6 was the plastic spectacle lens formed from the second base, the first hard coating layer, and the first optical multilayer film.

TABLE 3

| Base side | Layer | Material | Refractive index (wavelength 500 nm) | Film thickness (nm) |
|---|---|---|---|---|
| Antireflection film | First layer | SiO$_2$ | 1.4780 | 22.80 |
| | Second layer | TiO$_2$ | 2.3938 | 16.50 |
| | Third layer | SiO$_2$ | 1.4780 | 38.20 |
| | Fourth layer | TiO$_2$ | 2.3938 | 47.00 |
| | Fifth layer | SiO$_2$ | 1.4780 | 19.10 |

TABLE 3-continued

| | | | (Hard coating layer side) | |
|---|---|---|---|---|
| Base side | Layer | Material | Refractive index (wavelength 500 nm) | Film thickness (nm) |
| | Sixth layer | TiO$_2$ | 2.3938 | 36.00 |
| | Seventh layer | SiO$_2$ | 1.4780 | 99.00 |
| Water-repellent layer | | | Provided | |

<<Distribution of Internal Transmittances of Base in Visible Range, and the Like>>

For the first base corresponding to example 1 and the second base corresponding to comparative example 1, distributions of transmittances and internal transmittances in the visible range were measured and calculated.

The visible range was a range of wavelengths of not less than 380 nm and not greater than 780 nm.

The transmittance in the visible range was measured by a spectrophotometer.

The distribution of internal transmittances in the visible range was calculated in the following manner based on the distribution of transmittances in the visible range.

Specifically, as shown in FIG. 1, $R_1$ represents a reflectance on a surface on which light is incident in the case of the light being incident on a lens (base) LE, and $R_2$ represents a reflectance on the opposite surface. $T_i$ represents an internal transmittance of the lens LE. In the description herein, the reflectance and the transmittance are to be considered. Therefore, an intensity of the incident light may be considered as 1. In this case, the transmittance T was a sum of A', B', . . . in FIG. 1 in consideration of absorption and reflection on both surfaces by the lens LE.

A' is represented by $F_2$-$F_3$ in FIG. 1, and B' is represented by $F_6$-$F_7$ in FIG. 1.

$F_1=1-R_1$ is satisfied in FIG. 1. Furthermore, each value is represented as follows.

$$F_2=(1-R_1)T_i,$$

$$F_3=(1-R_1)T_iR_2,$$

$$F_4=(1-R_1)T_iR_2T_i=(1-R_1)T_i^2R_2,$$

$$F_5=(1-R_1)T_i^2R_1R_2,$$

$$F_6=(1-R_1)T_i^3R_1R_2,$$

$$F_7=(1-R_1)T_i^3R_1R_2^2.$$

According to the above, the transmittance T is calculated as follows.

$$\begin{aligned}
T &= A' + B' + \ldots \\
&= (F_2 - F_3) + (F_6 - F_7) + \ldots \\
&= [\{(1-R_1)T_i\} - \{(1-R_1)T_iR_2\}] + \\
&\quad [\{(1-R_1)T_i^3R_1R_2\} - \{(1-R_1)T_i^3R_1R_2^2\}] + \ldots \\
&= (1-R_1)T_i\{(1-R_2) + T_i^2R_1R_2(1-R_2) + \ldots\} \\
&= (1-R_1)(1-R_2)T_i(1 + T_i^2R_1R_2 + \ldots),
\end{aligned}$$

and, furthermore, $(1+T_i^2R_1R_2+\ldots)$ is expressed, according to the formula of geometric series with a common ratio of $R_1R_2T_i^2$, as $(1+T_i^2R_1R_2+\ldots)=1/(1-R_1R_2T_i^2)$, and expressed eventually as $T=(1-R_1)(1-R_2)T_i/(1-R_1R_2T_i^2)$ (this expression is referred to as expression 1), and, when the distribution of the transmittances T is measured, the distribution of the internal transmittances $T_i$ can be calculated according to expression 1.

Figure 2:
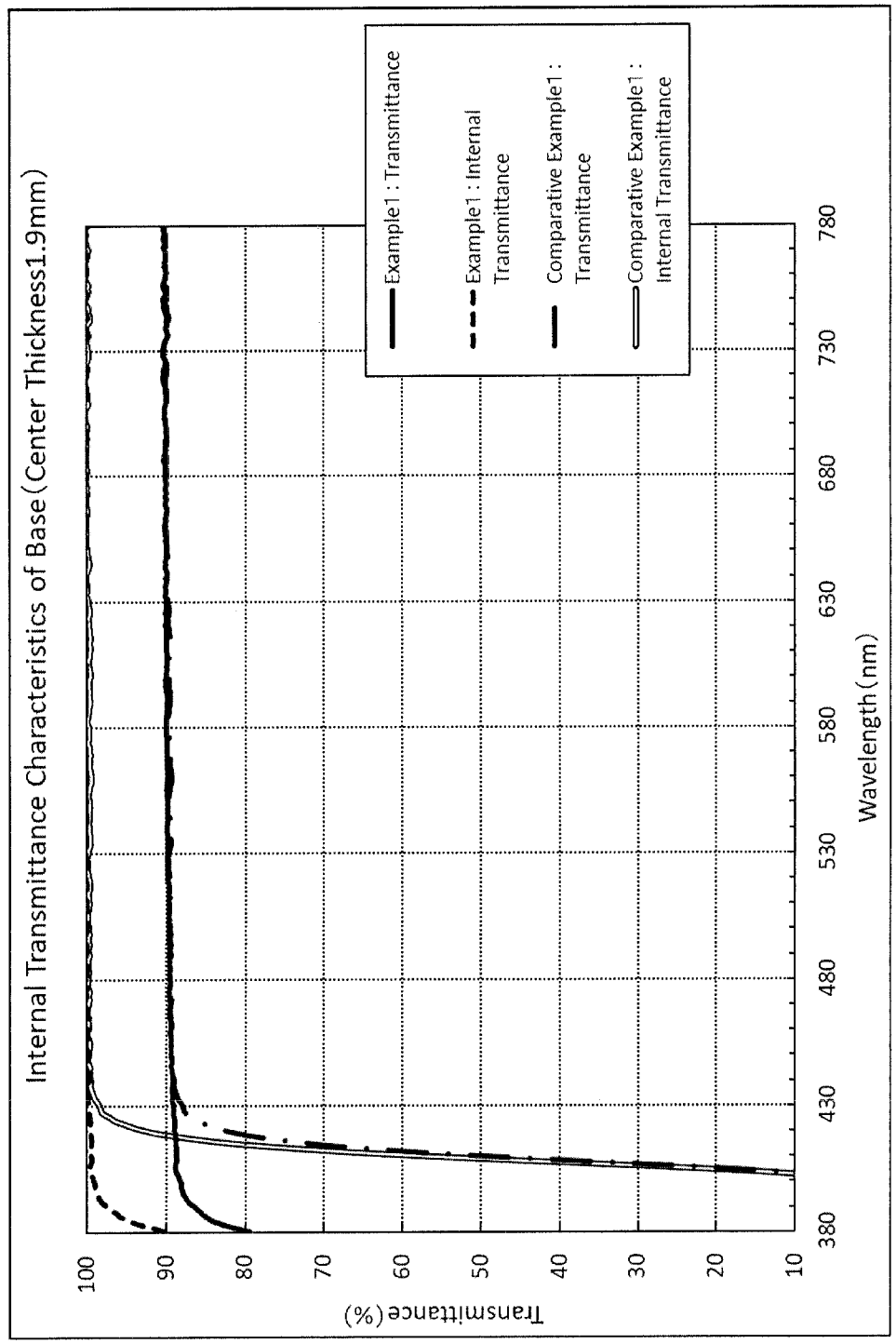
FIG. 2 shows a graph representing distributions of transmittances and internal transmittances in a visible range (not less than 380 nm and not greater than 780 nm) according to example 1 (first base) and comparative example 1 (second base).

Distributions of transmittances and internal transmittances in the visible range are shown in FIG. 2 for the first base corresponding to example 1 and the second base corresponding to comparative example 1.

In both example 1 and comparative example 1, the transmittances were constant in a narrow range of not less than 89% and not greater than 91% for a wavelength of not less than 440 nm and not greater than 780 nm. However, in a range of wavelengths of not less than 380 nm and not greater than 400 nm, the transmittance was almost 80% or higher in example 1 whereas the transmittance was less than 10% in comparative example 1.

In both example 1 and comparative example 1, the internal transmittances were constant in a narrow range of not less than 98% and not greater than 100% for a wavelength of not less than 440 nm and not greater than 780 nm. However, in a range of wavelengths of not less than 380 nm and not greater than 400 nm, the transmittance was not less than 90% in example 1 whereas the transmittance was less than 10% in comparative example 1.

<<Transmittance Distribution, Reflectance Distribution, and the Like of Spectacle Lens in Visible Range>>

Figure 3:
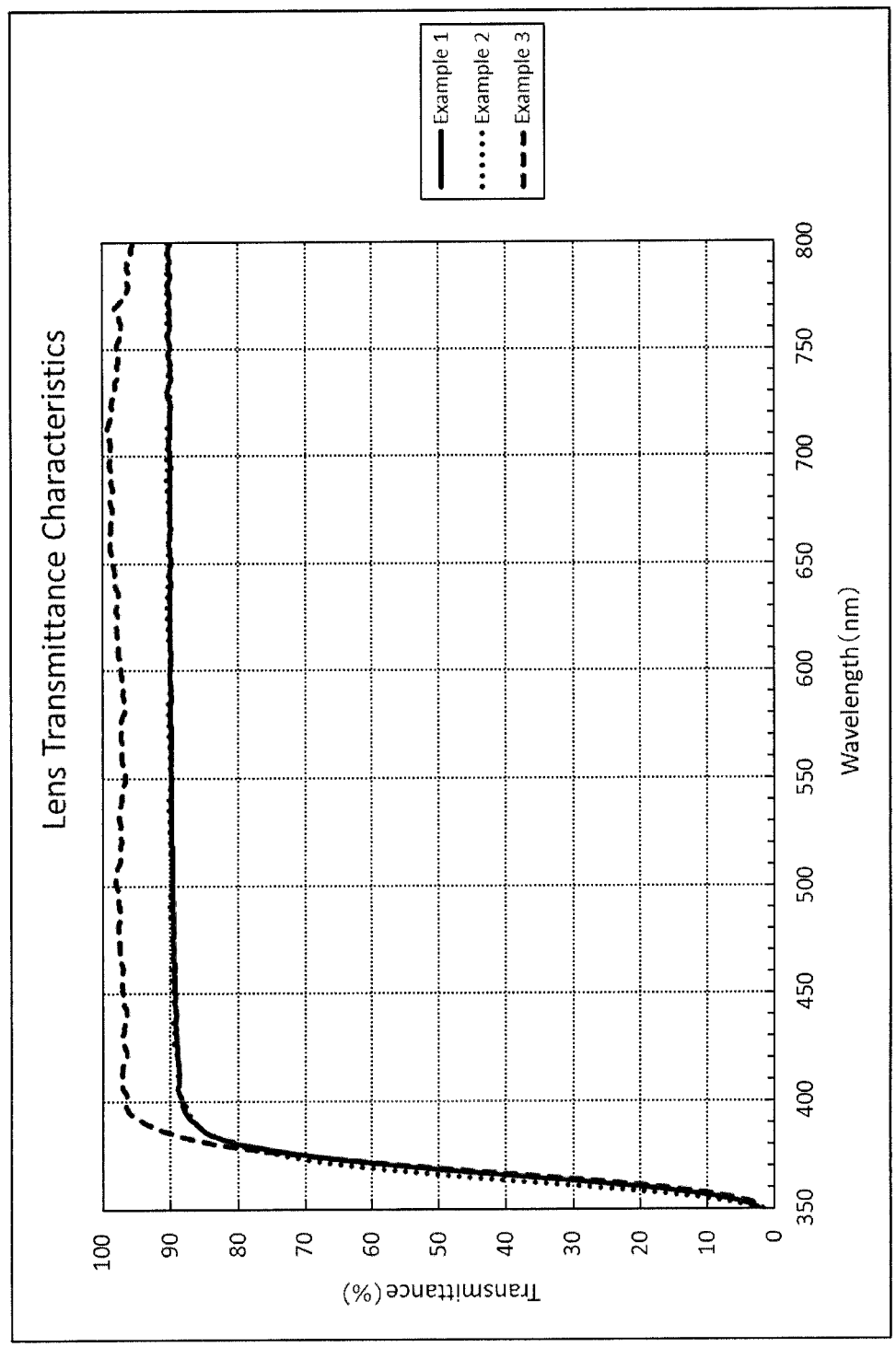
FIG. 3 shows a graph representing a transmittance distribution (transmittance characteristics) in a visible range according to examples 1 to 3.
Figure 4:
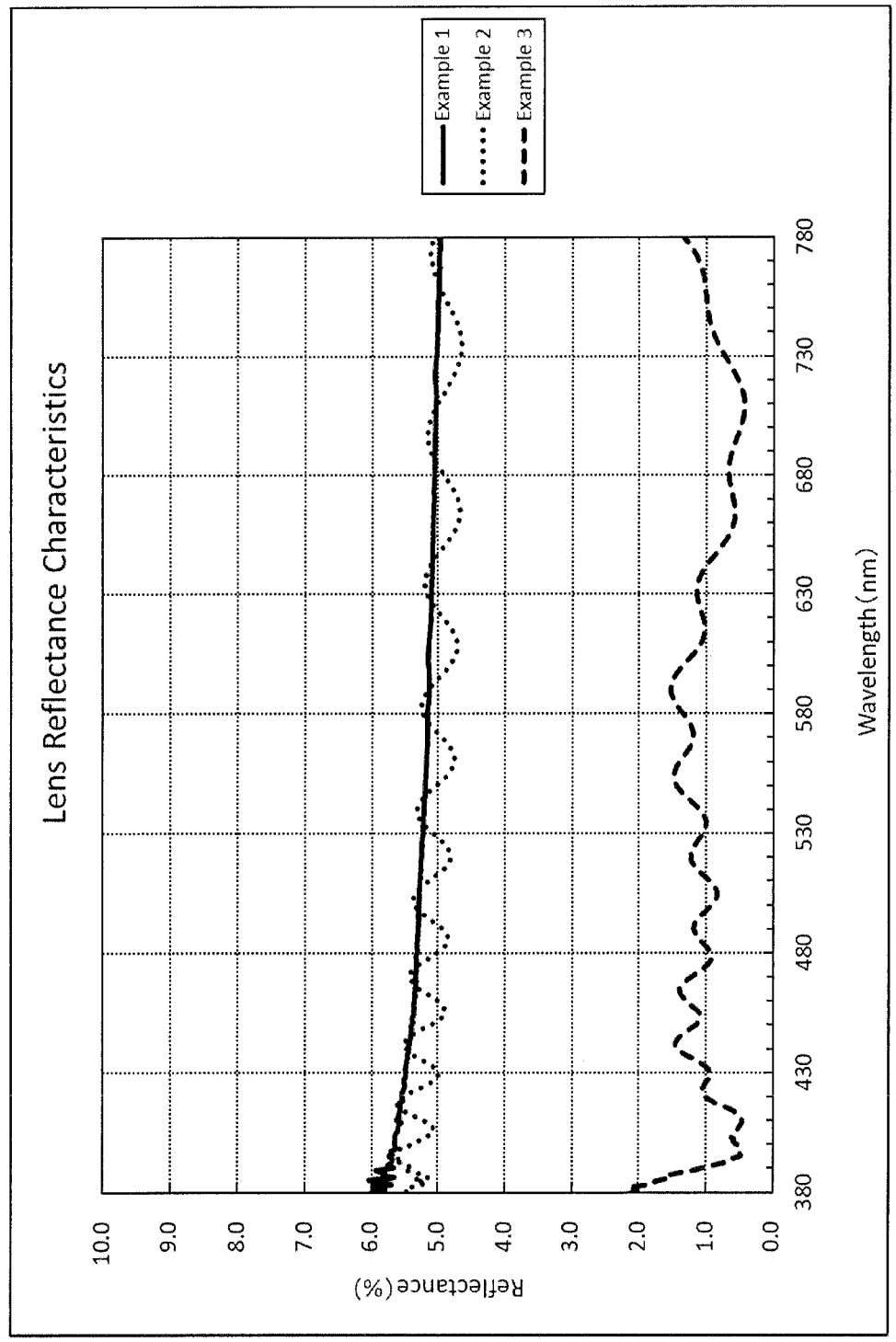
FIG. 4 shows a graph representing a reflectance distribution (reflectance characteristics) in a visible range according to examples 1 to 3.
Figure 5:
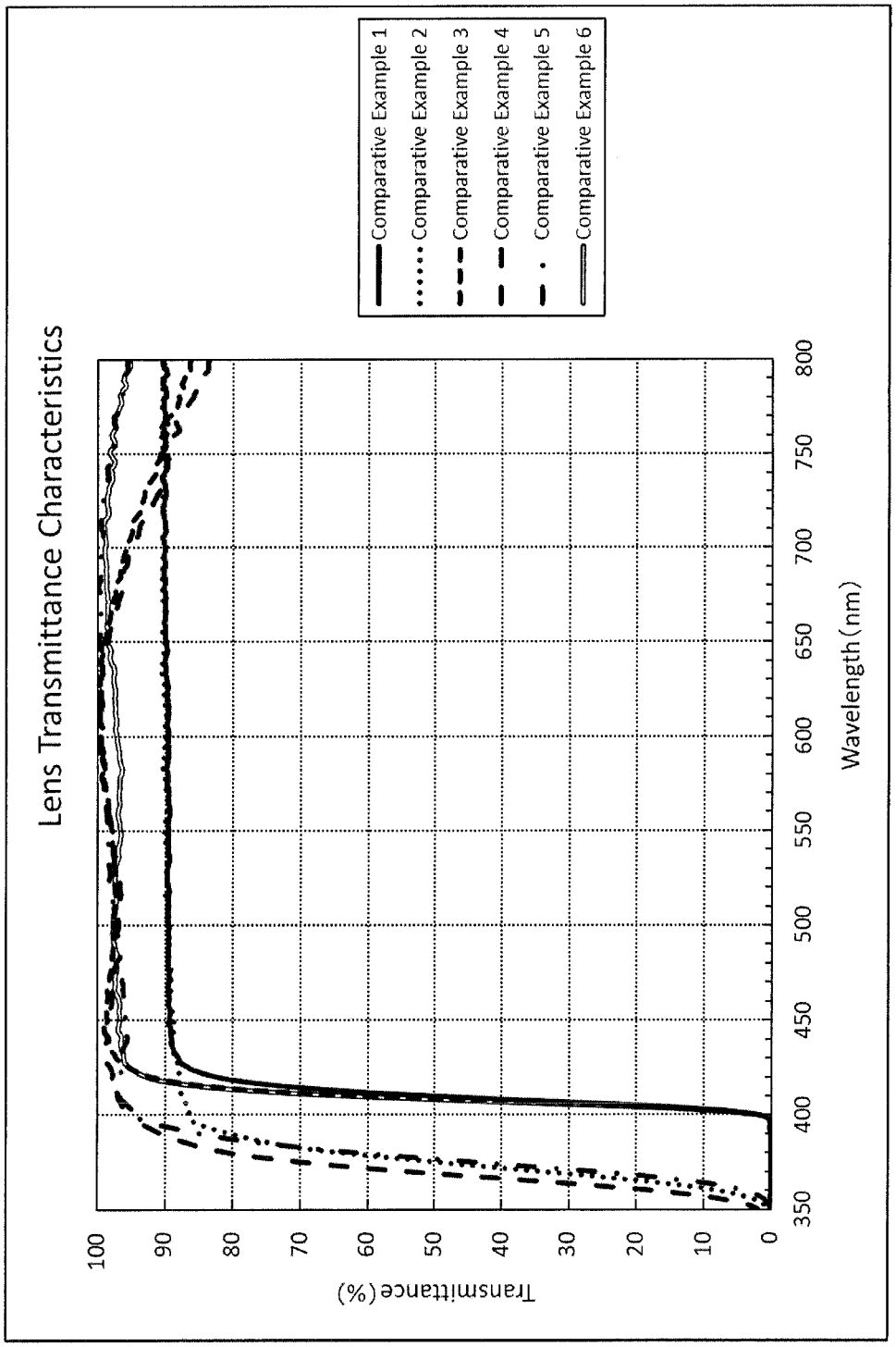
FIG. 5 shows a graph representing a transmittance distribution (transmittance characteristics) in a visible range according to comparative examples 1 to 6.
Figure 6:
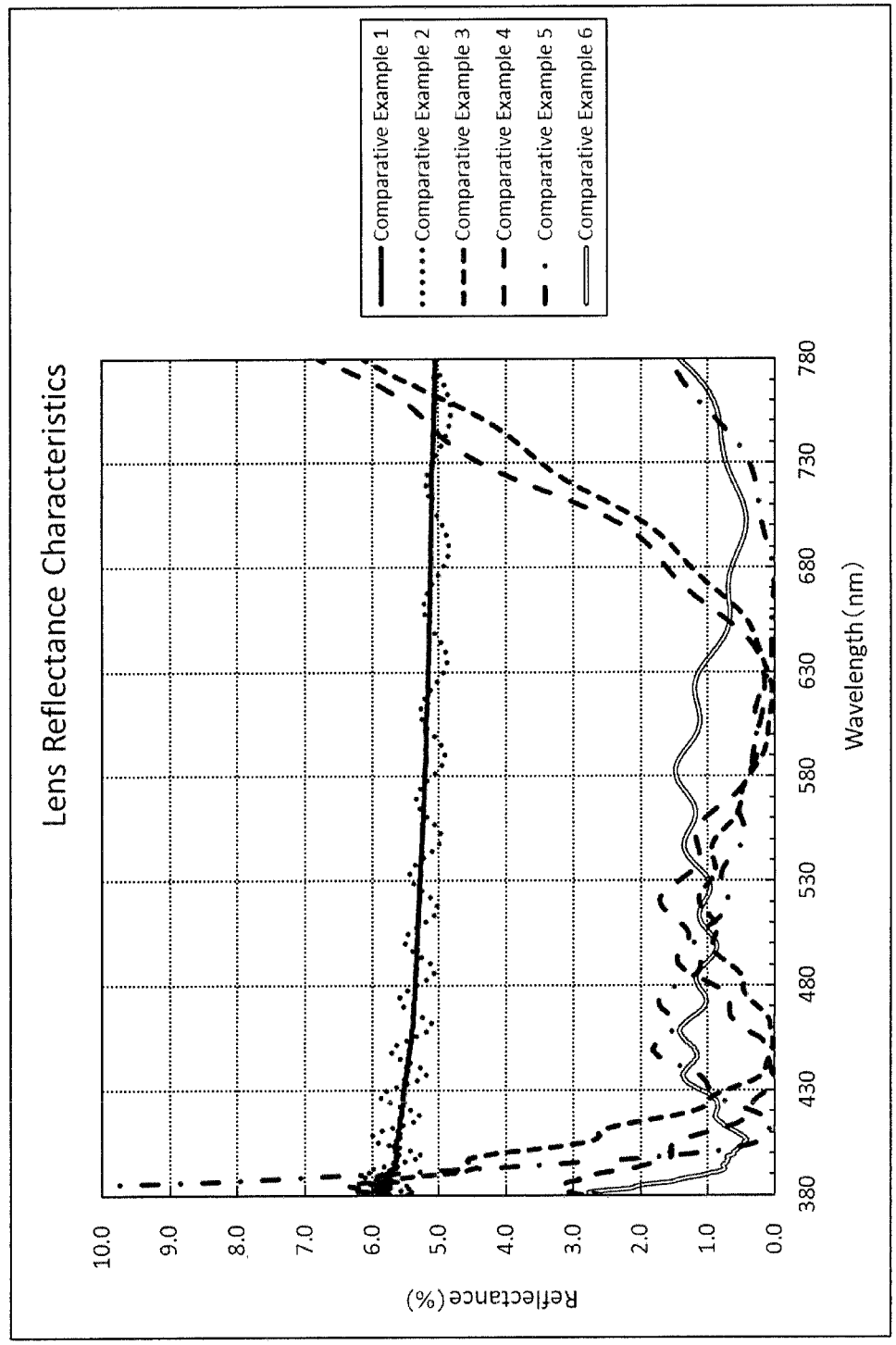
FIG. 6 shows a graph representing a reflectance distribution (reflectance characteristics) in a visible range according to comparative examples 1 to 6.

FIGS. 3 and 4 show distributions of transmittances and reflectances (transmittance characteristics, reflectance characteristics) in the visible range in examples 1 to 3. FIGS. 5 and 6 show distributions of transmittances and reflectances (transmittance characteristics, reflectance characteristics) in the visible range in comparative examples 1 to 6. The transmittance characteristics (FIGS. 3, 5) represent values in a range of wavelengths of not less than 350 nm and not greater than 800 nm.

The transmittance distribution and the reflectance distribution in the visible range were measured by a spectrophotometer.

In examples 1 and 2, the transmittances were distributed so as to have constant high values in a range of not less than 88% and not greater than 91% in a range of wavelengths of not less than 400 nm and not greater than 800 nm, and a difference between the highest transmittance $T_{max}$ and the lowest transmittance $T_{min}$ was not greater than 10 points (about 2 points) in a range of wavelengths of not less than 400 nm and not greater than 780 nm. Furthermore, in examples 1 and 2, the transmittances were distributed so as to monotonously increase such that the transmittances were not less than 80% in a range of wavelengths of not less than 380 nm and less than 400 nm. Moreover, in examples 1 and 2, the transmittances were distributed so as to be about 60% at the wavelength of 370 nm, about 20% at the wavelength of 360 nm, and about 3% at the wavelength of 350 nm.

In example 1, the reflectances were distributed so as to almost monotonously decrease such that the reflectances had small values in a range of not less than 5% and not greater than 5.6% in a range of wavelengths of not less than 400 nm and not greater than 780 nm, and the reflectances had values in a range of not less than 5.6% and not greater than 6.1% in a range of not less than 380 nm and less than 400 nm.

In example 2, the reflectances were distributed so as to have small values in a range of not less than 4.7% and not greater than 5.6% in a range of wavelengths of not less than 400 nm and not greater than 780 nm, and the reflectances had values in a range of not less than 5.1% and not greater than 5.8% in a range of wavelengths of not less than 380 nm and less than 400 nm.

In example 3, the transmittances were distributed so as to have further increased constant values in a range of not less than 95% and not greater than 99% in a range of wavelengths of not less than 400 nm and not greater than 800 nm, and a difference between the highest transmittance $T_{max}$ and the lowest transmittance $T_{min}$ was not greater than 10 points (about 3 points) in a range of wavelengths of not less than 400 nm and not greater than 780 nm. In example 3, the transmittances were distributed so as to monotonously increase such that the transmittance was not less than 80% in a range of wavelengths of not less than 380 nm and less than 400 nm, and the transmittances were similar to those of examples 1 and 2 when the wavelength was less than 380 nm.

In example 3, the reflectances were distributed in a range of small values of not less than 0.4% and not greater than 1.6% in a range of wavelengths of not less than 400 nm and not greater than 780 nm, and the reflectances were in a range of small values of not less than 0.4% and not greater than 2.1% in a range of wavelengths of not less than 380 nm and less than 400 nm.

Meanwhile, in comparative example 1, the transmittances were distributed so as to have constant high values in a range of not less than 88% and not greater than 91% in a range of wavelengths of not less than 430 nm and not greater than 800 nm. However, when the wavelength was shorter than 430 nm, the transmittance was rapidly decreased according to the wavelength becoming shorter, and the transmittance was about 80% at the wavelength of 420 nm and was about 50% at the wavelength of 410 nm, and the transmittance was 0% at least in a range of wavelengths of not less than 350 nm and not greater than 398 nm. In comparative example 1, the transmittances were distributed such that a difference between the highest transmittance $T_{max}$ and the lowest transmittance $T_{min}$ was not less than 10 points (about 85 points) in a range of wavelengths of not less than 400 nm and not greater than 780 nm.

The reflectance distribution of comparative example 1 was almost the same as that of example 1.

The transmittance distribution of comparative example 2 was almost the same as that of comparative example 1 except that the transmittance was rapidly decreased in a wavelength range on the shorter wavelength side than in comparative example 1, and the transmittances of comparative example 2 was about 87% at the wavelength of 400 nm, was about 80% at the wavelength of 390 nm, was about 60% at the wavelength of 380 nm, and was 0% when the wavelength was not greater than 350 nm. In comparative example 2, the transmittances were distributed such that a difference between the highest transmittance $T_{max}$ and the lowest transmittance $T_{min}$ was not greater than 10 points (about 5 points) in a range of wavelengths of not less than 400 nm and not greater than 780 nm.

The reflectance distribution of comparative example 2 was almost the same as that of example 2.

The transmittance distribution of comparative example 3 was almost the same as that of comparative example 1 except that the transmittances had different values in a range of wavelengths of not less than 430 nm and not greater than 800 nm. The transmittance was in a range of not less than 95% and not greater than 98% in this wavelength range, and was about 90% at the wavelength of 420 nm, was about 60% at the wavelength of 410 nm, and was almost the same as in comparative example 1 when the wavelength was shorter than 405 nm. In comparative example 3, the transmittances were distributed such that a difference between the highest transmittance $T_{max}$ and the lowest transmittance $T_{min}$ was not less than 10 points (about 95 points) in a range of wavelengths of not less than 400 nm and not greater than 780 nm In comparative example 3, the reflectances were distributed such that the reflectances on both ends in the visible range were around 6%, and included two minimal values approximate to 0%, and the reflectance distribution formed a mortar-like shape.

In comparative example 4, the transmittance distribution was almost the same as that of comparative example 3 except that the transmittances had different values in a range of wavelengths of not greater than 430 nm. When the wavelength was shorter than 430 nm, the transmittance was not less than 95% until the wavelength of 400 nm, was about 90% at the wavelength of 390 nm, was about 80% at the wavelength of 380 nm, was about 50% at the wavelength of 370 nm, was about 15% at the wavelength of 360 nm, and was about 3% at the wavelength of 350 nm. In comparative example 4, the transmittances were distributed such that a difference between the highest transmittance $T_{max}$ and the lowest transmittance $T_{min}$ was not less than 10 points (about 15 points) in a range of wavelengths of not less than 400 nm and not greater than 780 nm.

In comparative example 4, the reflectances were distributed such that the reflectance on the short wavelength end in the visible range was around 3%, the reflectance on the long wavelength end was about 7%, and the reflectance distribution included two minimal values approximate to 0%, and formed a mortar-like shape.

In comparative example 5, the transmittance distribution was the same as that of comparative example 2 in a range of wavelengths of not less than 350 nm and less than 390 nm. In comparative example 5, the transmittance continued to monotonously increase up to about 96% in a range of wavelengths of not less than 390 nm and less than 400 nm, and the transmittances were in a range of not less than 95% and less than 100% in a range of wavelengths of not less than 400 nm and less than 800 nm. In comparative example 5, the transmittances were distributed such that a difference between the highest transmittance $T_{max}$ and the lowest transmittance $T_{min}$ was not greater than 10 points (about 6 points) in a range of wavelengths of not less than 400 nm and not greater than 780 nm.

In comparative example 5, the reflectances were distributed in a range of not less than 0% and not greater than 2% in a range of wavelengths of not less than 400 nm, and the reflectance monotonously and rapidly decreased from 10% or more to about 1% in a range of wavelengths of less than 400 nm.

The transmittance distribution of comparative example 6 was the same as that of comparative example 3 in a range of wavelengths of not less than 350 nm and less than 430 nm, and was the same as that of comparative example 5 in a range of wavelengths of not less than 430 nm. In comparative example 6, the transmittances were distributed such that a difference between the highest transmittance $T_{max}$ and the lowest transmittance $T_{min}$ was not less than 10 points (about 95 points) in a range of wavelengths of not less than 400 nm and not greater than 780 nm.

In comparative example 6, the reflectances were distributed in a range of not less than 0.5% and not greater than 3% in the visible range.

<<Difference of Color of Visible Light from Object According to Whether or Not the Light has Been Transmitted Through the Spectacle Lens, and the Like>>

In each of examples and comparative examples, a test for measuring a color of an object for each of light transmitted through the lens and light (direct light) which did not pass through the lens was performed in order to check a difference between viewing through the lenses and viewing with naked eyes.

Figure 7:
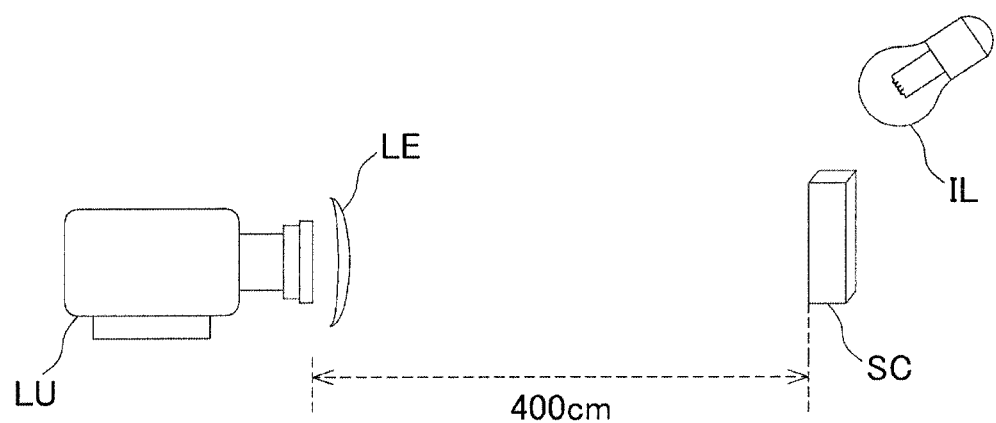
FIG. 7 is a schematic diagram illustrating a test for measuring a color of an object for light transmitted through a lens and light (direct light) that does not pass through the lens.

FIG. 7 is a schematic diagram illustrating the test.

In the test, a spectroradiometer LU (CS2000 manufactured by KONICA MINOLTA, INC.) was used. Color SCs (eight colors were extracted from the 18th edition of "color guide" available from DIC Corporation) were each disposed at a position distant from the spectroradiometer LU by 400 cm (centimeter) in a dark room for each color while being illuminated by a light source IL (color rendering AA light source, high color rendering type fluorescent lamp manufactured by Hitachi, Ltd.). In order to recognize a color (color of reflected light of light from the light source IL according to the color SC) of an object in a state where no lens LE was used (corresponding to naked eyes), a distribution of spectral radiance in the visible range was measured. In order to recognize a color of the object in a state where the light from the color SC was transmitted through the lens LE (corresponding to an equipped state), in a state where the lens LE was disposed in front of the spectroradiometer LU, the spectral reflectance distribution in a visible range of light from the color SC through the lens LE was measured, and each value (lightness $L^*$, chromaticity $a^*$ in the red(+)-green(−) direction, chromaticity $b^*$ in the yellow(+)-blue(−) direction) in in the $L^*a^*b^*$ color system (International Commission on Illumination CIE1976) was measured, and a saturation $C^*$ and a hue angle h were calculated.

The equation of the value of the saturation $C^*$ is given as $C^*=[(a^*)^2+(b^*)^2]^{1/2}$. The less the value of the saturation $C^*$ indicates the darker color and the greater the value of the saturation $C^*$ indicates the brighter color.

The hue angle h is an angle between the $a^*$ axis and a straight line connecting between the originating point and a point on the $a^*b^*$ plane for the color, and $h=\tan^{-1}(b^*/a^*)$ is satisfied. A difference $\Delta h$ between the hue angles h of any two colors servers as an index representing a deviation in color. The less the $\Delta h$ is, the less the deviation between the two colors is.

Figure 8:
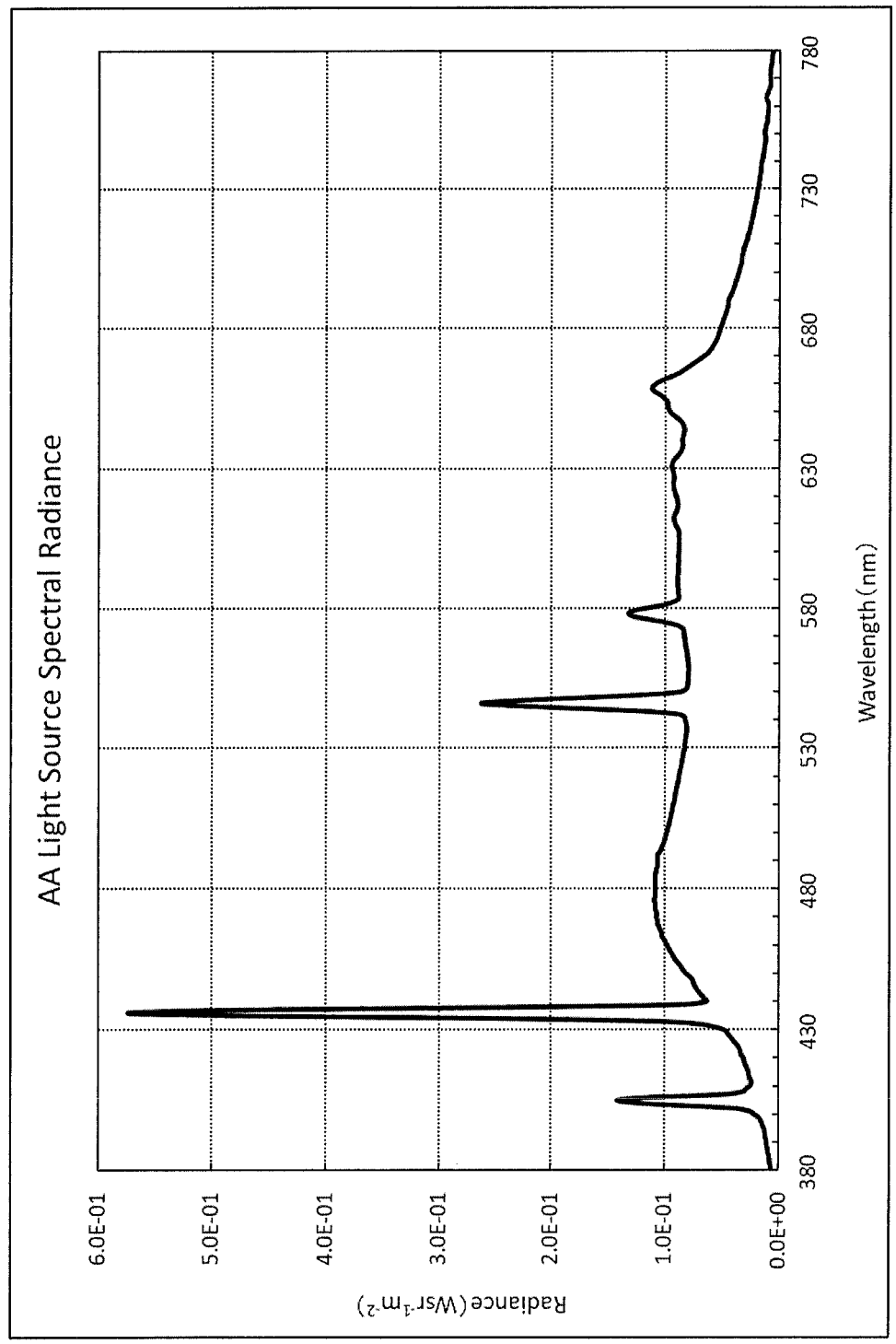
FIG. 8 shows a graph representing spectral radiances in a visible range according to a light source used in the test shown in FIG. 7.

FIG. 8 shows a spectral radiance distribution in the visible range according to the light source IL. The spectral radiance distribution is approximate to the distribution of the sunlight except for sharp peaks. "E" and the immediately following number n represent "×10ⁿ". For example, "1.0E−01" represents "$1.0 \times 10^{-1}$", and the same applies to the other expressions.

Figure 9:
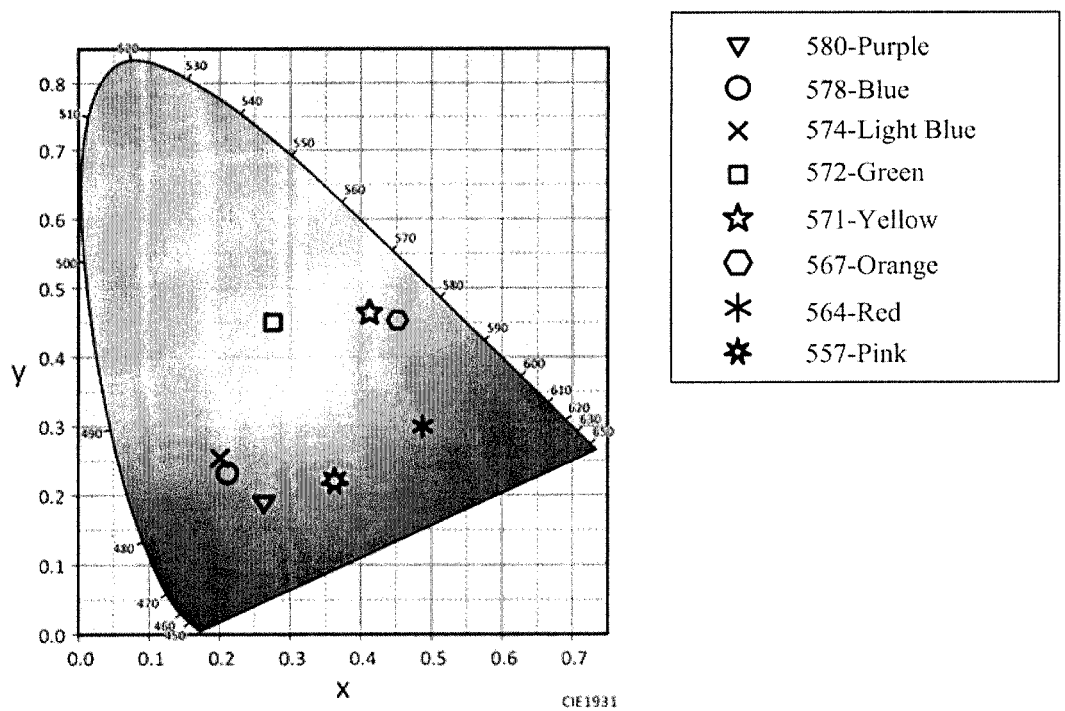
FIG. 9 shows a graph representing a position of each color, on the CIE chromaticity diagram, used in the test shown in FIG. 7.

The color SCs of the eight colors were No. 557 (pink-based color), No. 564 (red-based color), No. 567 (orange-based color), No. 571 (yellow-based color), No. 572 (green-based color), No. 574 (light blue-based color), No. 578 (blue-based color), and No. 580 (purple-based color). Values of an xy coordinate (x, y) in the xy color system, that is, positions on the CIE (International Commission on Illumination) chromaticity diagram are shown in FIG. 9. (x, y) of the color represents values at the viewing angle of 2 degrees with the D65 light source. In the following [Table 4], values of $L^*$, $a^*$, $b^*$, $C^*$, h for each color SC in the state where no lens was used, are indicated.

TABLE 4

|  |  | 557 pink | 564 red | 567 Orange | 571 Yellow | 572 green | 574 light blue | 578 blue | 580 purple |
|---|---|---|---|---|---|---|---|---|---|
| No lens was used | L* (lightness) | 63.13 | 67.28 | 111.16 | 128.1 | 87.48 | 89.86 | 77.34 | 56.14 |
|  | a* | 64.19 | 65.88 | 2.74 | −20.25 | −64.85 | −31.87 | −10.08 | 37.62 |
|  | b* | −23.07 | 22.45 | 96.17 | 97.11 | 35.47 | −40.15 | −42.79 | −42.6 |
|  | C* (saturation) | 68.21 | 69.6 | 96.21 | 99.2 | 73.92 | 51.26 | 43.96 | 56.84 |
|  | h (hue angle) | 340.23 | 18.82 | 88.37 | 101.78 | 151.32 | 231.56 | 256.75 | 311.45 |

In the following [Table 5], values of $L^*$, $a^*$, $b^*$, $C^*$, h, $\Delta h$ for each color SC according to examples 1 to 3 are indicated. In [Table 6], the corresponding values according to comparative examples 1 to 3 are similarly indicated. In [Table 7], the corresponding values according to comparative examples 4 to 6 are similarly indicated.

$\Delta h$ represents a difference of a hue angle from a hue angle of a color of the color SC viewed without the lens.

TABLE 5

|  |  | 557 pink | 564 red | 567 orange | 571 yellow | 572 green | 574 light blue | 578 blue | 580 purple |
|---|---|---|---|---|---|---|---|---|---|
| Example 1 | L* (lightness) | 60.40 | 65.08 | 107.15 | 123.05 | 84.53 | 86.52 | 74.21 | 54.66 |
|  | a* | 61.55 | 63.49 | 2.66 | −19.45 | −62.53 | −30.63 | −9.83 | 35.58 |
|  | b* | −21.87 | 21.82 | 92.29 | 93.55 | 34.34 | −38.02 | −40.78 | −40.37 |
|  | C* (saturation) | 65.32 | 67.13 | 92.33 | 95.55 | 71.34 | 48.83 | 41.95 | 53.81 |
|  | h (hue angle) | 340.44 | 18.97 | 88.35 | 101.74 | 151.22 | 231.15 | 256.45 | 311.39 |
|  | Δh (difference from hue angle in the case of no lens being used) | 0.21 | 0.15 | −0.02 | −0.04 | −0.10 | −0.41 | −0.30 | −0.06 |
| Example 2 | L* (lightness) | 60.83 | 65.29 | 108.28 | 123.35 | 85.05 | 86.73 | 74.95 | 54.58 |
|  | a* | 62.06 | 63.70 | 2.81 | −19.52 | −62.73 | −30.71 | −10.03 | 36.11 |
|  | b* | −21.96 | 22.07 | 93.80 | 93.86 | 34.48 | −38.08 | −40.91 | −40.77 |

TABLE 5-continued

|  |  | 557 pink | 564 red | 567 orange | 571 yellow | 572 green | 574 light blue | 578 blue | 580 purple |
|---|---|---|---|---|---|---|---|---|---|
|  | C* (saturation) | 65.83 | 67.42 | 93.84 | 95.87 | 71.58 | 48.92 | 42.12 | 54.46 |
|  | h (hue angle) | 340.51 | 19.11 | 88.29 | 101.75 | 151.21 | 231.11 | 256.22 | 311.53 |
|  | Δh (difference from hue angle in the case of no lens being used) | 0.28 | 0.29 | −0.08 | −0.03 | −0.11 | −0.45 | −0.53 | 0.08 |
| Example 3 | L* (lightness) | 62.97 | 67.02 | 111.70 | 125.18 | 87.36 | 88.68 | 77.28 | 56.41 |
|  | a* | 64.13 | 64.55 | 2.91 | −19.77 | −63.69 | −32.49 | −10.25 | 37.29 |
|  | b* | −22.80 | 21.90 | 96.12 | 94.78 | 34.52 | −40.06 | −42.15 | −42.11 |
|  | C* (saturation) | 68.06 | 68.16 | 96.16 | 96.82 | 72.44 | 51.58 | 43.37 | 56.25 |
|  | h (hue angle) | 340.43 | 18.74 | 88.26 | 101.78 | 151.54 | 230.96 | 256.33 | 311.52 |
|  | Δh (difference from hue angle in the case of no lens being used) | 0.20 | −0.08 | −0.11 | 0.00 | 0.22 | −0.60 | −0.42 | 0.07 |

TABLE 6

|  |  | 557 pink | 564 red | 567 orange | 571 yellow | 572 green | 574 light blue | 578 blue | 580 purple |
|---|---|---|---|---|---|---|---|---|---|
| Comparative example 1 | L* (lightness) | 60.50 | 65.28 | 106.70 | 122.29 | 84.22 | 86.19 | 74.23 | 54.40 |
|  | a* | 60.89 | 62.45 | 2.53 | −19.45 | −62.83 | −32.10 | −10.70 | 34.36 |
|  | b* | −21.12 | 21.91 | 92.85 | 93.45 | 34.91 | −37.87 | −40.04 | −39.09 |
|  | C* (saturation) | 64.45 | 66.18 | 92.89 | 95.45 | 71.87 | 49.65 | 41.45 | 52.04 |
|  | h (hue angle) | 340.87 | 19.33 | 88.44 | 101.76 | 150.95 | 229.72 | 255.04 | 311.32 |
|  | Δh (difference from hue angle in the case of no lens being used) | 0.64 | 0.51 | 0.07 | −0.02 | −0.37 | −1.84 | −1.71 | −0.13 |
| Comparative example 2 | L* (lightness) | 60.50 | 65.14 | 107.31 | 122.70 | 84.77 | 86.50 | 74.27 | 54.51 |
|  | a* | 61.53 | 63.47 | 2.68 | −19.33 | −62.70 | −31.40 | −10.08 | 35.69 |
|  | b* | −21.58 | 21.91 | 92.97 | 93.52 | 34.76 | −38.18 | −40.53 | −40.30 |
|  | C* (saturation) | 65.21 | 67.14 | 93.00 | 95.50 | 71.69 | 49.43 | 41.77 | 53.83 |
|  | h (hue angle) | 340.67 | 19.04 | 88.35 | 101.68 | 151.00 | 230.56 | 256.04 | 311.53 |
|  | Δh (difference from hue angle in the case of no lens being used) | 0.44 | 0.22 | −0.02 | −0.10 | −0.32 | −1.00 | −0.71 | 0.08 |
| Comparative example 3 | L* (lightness) | 63.69 | 67.16 | 112.51 | 125.22 | 88.35 | 89.14 | 77.80 | 56.58 |
|  | a* | 64.32 | 64.59 | 3.48 | −18.98 | −64.11 | −32.31 | −11.32 | 36.67 |
|  | b* | −22.25 | 22.63 | 97.36 | 95.27 | 35.78 | −39.88 | −39.66 | −41.22 |
|  | C* (saturation) | 68.06 | 68.44 | 97.42 | 97.14 | 73.42 | 51.32 | 41.25 | 55.17 |
|  | h (hue angle) | 340.92 | 19.31 | 87.95 | 101.27 | 150.83 | 230.99 | 254.08 | 311.66 |
|  | Δh (difference from hue angle in the case of no lens being used) | 0.69 | 0.49 | −0.42 | −0.51 | −0.49 | −0.57 | −2.67 | 0.21 |

TABLE 7

|  |  | 557 pink | 564 red | 567 orange | 571 yellow | 572 green | 574 light blue | 578 blue | 580 purple |
|---|---|---|---|---|---|---|---|---|---|
| Comparative example 4 | L* (lightness) | 63.31 | 67.23 | 112.03 | 126.25 | 87.77 | 89.19 | 77.67 | 56.67 |
|  | a* | 64.10 | 66.07 | 3.88 | −18.72 | −63.39 | −31.18 | −9.17 | 37.86 |
|  | b* | −22.42 | 22.64 | 96.80 | 95.85 | 35.12 | −40.70 | −42.89 | −42.29 |
|  | C* (saturation) | 67.91 | 69.84 | 96.88 | 97.66 | 72.47 | 51.27 | 43.86 | 56.76 |
|  | h (hue angle) | 340.72 | 18.91 | 87.70 | 101.05 | 151.01 | 232.54 | 257.93 | 311.84 |
|  | Δh (difference from hue angle in the case of no lens being used) | 0.49 | 0.09 | −0.67 | −0.73 | −0.31 | 0.98 | 1.18 | 0.39 |
| Comparative example 5 | L* (lightness) | 63.28 | 67.45 | 111.92 | 126.09 | 87.66 | 89.00 | 77.74 | 56.73 |
|  | a* | 64.38 | 64.92 | 3.37 | −19.42 | −63.79 | −33.11 | −10.78 | 37.03 |
|  | b* | −21.84 | 22.97 | 97.16 | 96.43 | 35.52 | −39.02 | −41.25 | −41.21 |
|  | C* (saturation) | 67.98 | 68.87 | 97.22 | 98.37 | 73.01 | 51.17 | 42.63 | 55.40 |
|  | h (hue angle) | 341.26 | 19.48 | 88.01 | 101.38 | 150.89 | 229.69 | 255.36 | 311.94 |
|  | Δh (difference from hue angle in the case of no lens being used) | 1.03 | 0.66 | −0.36 | −0.40 | −0.43 | −1.87 | −1.39 | 0.49 |

TABLE 7-continued

|  |  | 557 pink | 564 red | 567 orange | 571 yellow | 572 green | 574 light blue | 578 blue | 580 purple |
|---|---|---|---|---|---|---|---|---|---|
| Comparative example 6 | L* (lightness) | 62.68 | 67.12 | 111.40 | 125.90 | 87.90 | 89.05 | 77.26 | 56.45 |
|  | a* | 63.59 | 65.40 | 2.81 | −19.92 | −65.18 | −32.95 | −10.96 | 36.25 |
|  | b* | −22.16 | 22.94 | 96.56 | 95.78 | 36.22 | −39.18 | −41.70 | −40.93 |
|  | C* (saturation) | 67.34 | 69.31 | 96.60 | 97.83 | 74.57 | 51.19 | 43.12 | 54.67 |
|  | h (hue angle) | 340.79 | 19.33 | 88.33 | 101.75 | 150.94 | 229.94 | 255.28 | 311.53 |
|  | Δh (difference from hue angle in the case of no lens being used) | 0.56 | 0.51 | −0.04 | −0.03 | −0.38 | −1.62 | −1.47 | 0.08 |

In example 1 (the first base), the internal transmittance was not less than 80% over the entirety of the visible range, and the hard coating layer and the optical multilayer film were not adhered, and, thus, the transmittance distribution was also at a high level over the entirety of the visible range. In any of the color SCs, the difference Δh of the hue angle from the hue angle in the case of no lens being used was greater than −1.0 and was less than +1.0. Color visibility changed little between a case where the color was seen with naked eyes and a case where the color was seen through the lens of example 1. In example 1, the color visibility with naked eyes was maintained. Furthermore, in example 1, the transmittances was about 60% at the wavelength of 370 nm, about 20% at the wavelength of 360 nm, and about 3% at the wavelength of 350 nm according to a kind of an ultraviolet absorber (absorption peak wavelength was 340 nm, which was less than 380 nm) or an amount thereof (relatively small amount). Transmission of light (ultraviolet light) outside a visible range (less than 380 nm) on the short wavelength side was inhibited. Therefore, protection of eyes and prevention of degradation of the lens were also considered while maintaining color visibility. Example 1 was the plastic lens, so that the lens providing excellent handleability and comfortability such as inhibiting breakage and allowing facilitation of weight reduction was produced.

In example 2, the first hard coating layer, that is, the hard coating layer having antimony oxide ($Sb_2O_5$) particles added thereto was added to the first base. Antimony oxide does not absorb light in the visible range. Therefore, transmission of visible light was not prevented also in the hard coating layer, so that the difference Δh of the hue angle from the hue angle in the case of no lens being used was greater than −1.0 and was less than +1.0 in any of color SCs, and color visibility with naked eyes was maintained in example 2. Furthermore, in example 2, similarly to example 1, transmission of light outside the visible range on the short wavelength side was inhibited, and a function of maintaining color visibility, a function of protecting eyes, and a function of preventing degradation of the lens were simultaneously achieved. Example 2 was a plastic lens, so that the lens providing excellent handleability and comfortability was produced.

In example 3, the first antireflection film was added to the structure of example 2. The first antireflection film had almost uniform reflection characteristics over the entirety of the visible range. This is indicated in the transmittance distribution (FIG. 3) in the visible range in which the distribution of example 3 was above the distribution of example 2 such that the values of examples 3 were greater by points that were not less than +6 and not greater than +8. Therefore, the first antireflection film allowed reduction of the reflectance without interfering with the characteristics of example 2, and the difference Δh of the hue angle from the hue angle in the case of no lens being used was greater than −1.0 and was less than +1.0 in any of color SCs, and color visibility with naked eyes was maintained in example 3. Furthermore, similarly to examples 1 and 2, transmission of light outside the visible range on the short wavelength side was inhibited, and a function of maintaining color visibility, a function of protecting eyes, and a function of preventing degradation of the lens were simultaneously achieved. Example 3 was the plastic lens, so that the lens providing excellent handleability and comfortability was produced.

Meanwhile, comparative example 1 (the second base) blocked light having a wavelength of less than 400 nm (FIG. 5), similarly to a standard plastic spectacle lens. Therefore, a kind of an ultraviolet absorber (absorption peak wavelength was 390 nm) and an amount of the ultraviolet absorber to be added (relatively large amount) were adjusted, and the internal transmittance (FIG. 2) rapidly increased from 0% to about 100% in a range of wavelengths of not less than 400 nm and not greater than 420 nm, and was 0% in a range of wavelengths of not less than 380 nm and less than 400 nm. Accordingly, when the lens of comparative example 1 was used in an equipped state, light in a range of wavelengths of not less than 380 nm and less than 400 nm did not reach the eyes, and deviation (difference Δh of hue angle) of the color from the color SC viewed without the lens was relatively increased such that the absolute value was not less than 1.0 in light blue (No. 574) and blue (No. 578) (−1.84, −1.71, respectively).

In comparative example 2, the second hard coating layer, that is, the hard coating layer having titanium oxide ($TiO_2$) particles added thereto was added to the first base (example 1). Titanium oxide absorbs light in the visible range (in particular, in a range of wavelengths of not less than 380 nm and less than 400 nm). Therefore, the hard coating layer prevented transmission of the visible light, so that the absolute value of a difference Δh of the hue angle from the hue angle in the case of no lens being used was not less than 1.0 (−1.00) for the color SC of light blue (No. 574), and reproducibility of color viewed with naked eyes was relatively degraded when the lens was used in an equipped state.

In comparative example 3, the second hard coating layer and the second antireflection film were added to the second base (comparative example 1). The second antireflection film was a standard antireflection film for the plastic spectacle lens, and, in the second antireflection film, the reflection color was blue to green. Due to addition of the ultraviolet absorber to the second base, absorption in the visible light region in the second hard coating layer, or reflection of light in blue to green wavelength range on the second antireflection film, the absolute value of a difference Δh of the hue angle in blue (No. 578) was not less than 1.0 (−2.67), and reproducibility of color viewed with naked eyes was relatively degraded when the lens was used in an equipped state.

In comparative example 4, the second antireflection film was added to the structure of example 2 (the first base and the first hard coating layer), and the second antireflection film reflected a relatively large amount of light in the blue to green region, and, therefore, the absolute value of a difference Δh of the hue angle in blue (No. 578) was not less than 1.0 (1.18), and reproducibility of color viewed with naked eyes was relatively degraded when the lens was used in an equipped state.

In comparative example 5, the third antireflection film was added to the structure of example 2, and the third antireflection film had a high reflectance in a range of wavelengths of not less than 380 nm and less than 400 nm according to the structure (design), and the high refractive index layer was a $TiO_2$ layer absorbing light in the visible range. Therefore, deviation (difference Δh of hue angle) of a color from the color SC viewed without the lens became relatively large such that the absolute value was not less than 1.0 in pink (No. 557), light blue (No. 574), and blue (No. 578) (1.03, −1.87, −1.39, respectively), and reproducibility of color viewed with naked eyes was relatively degraded when the lens was used in an equipped state.

In comparative example 6, the first hard coating layer and the first antireflection film were added to the second base (comparative example 1). Although titanium oxide was not used for the hard coating layer and the antireflection film, and the antireflection film was allowed to transmit light in a range of wavelengths of not less than 380 nm and less than 400 nm, an ultraviolet absorber absorbing light in this wavelength range was added to the base in a relatively large amount. Therefore, deviation (difference Δh of hue angle) of a color from the color SC viewed without the lens became relatively large such that the absolute value was not less than 1.0 in light blue (No. 574) and blue (No. 578) (−1.62, −1.47, respectively), and reproducibility of color viewed with naked eyes was relatively degraded when the lens was used in an equipped state.

Thus, for example, a kind and an amount of an ultraviolet absorber to be added to the base are adjusted, a kind and an amount of metal oxide particles to be added are adjusted in the case of the hard coating layer being added, or the structure (selection of the total number of the layers, the film thickness, the low refractive index material, and the high refractive index material) is adjusted in the case of the antireflection film being added, whereby a difference between the highest transmittance $T_{max}$ and the lowest transmittance $T_{min}$ in a range of wavelengths of not less than 400 nm and not greater than 780 nm is set to be not greater than 10 points, and the absolute value of a difference Δh in the hue angle between a case where no lens is used and a case where the lens is used in an equipped state is set to be less than 1.0. In this case, the plastic spectacle lens that has a high transmittance over almost the entirety of the visible range (not less than 380 nm and not greater than 780 nm), allows the color in the equipped state to be recognized as a color similar to a color viewed with naked eyes with an extremely small change in color in the equipped state, and provides excellent handleability and comfortability is provided. Furthermore, spectacles that use the lens, exhibit almost the same visibility as that with naked eyes, and provide excellent handleability and comfortability is provided.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. A plastic spectacle lens comprising:
   a plastic base including an ultraviolet absorber and having two opposed surfaces;
   a hard coating layer formed on both surfaces of the plastic base; and
   an antireflection film formed on each of the hard coating layers;
   wherein the antireflection film is an optical multilayer film consisting of five or more alternating layers of $ZrO_2$ and $SiO_2$, and wherein the antireflection film does not exhibit absorption characteristics in a range of visible light,
   wherein a difference between a highest transmittance and a lowest transmittance for light wavelengths in a range of 400 nm to not greater than 780 nm is not greater than 10 points,
   wherein an internal transmittance of the plastic base for light wavelengths in a range of 380 nm to not greater than 780 nm is at least 80% over an entirety of the wavelength range, and
   wherein the hard coating layer includes metal oxide particles, and the metal oxide of the metal oxide particles is an oxide of one or more metals other than Ti and Ce.

2. The plastic spectacle lens according to claim 1, wherein an absolute value of a difference between a hue angle of a color of light when the light does not pass through the plastic spectacle lens and a hue angle of a color of the light when the light is transmitted through the plastic spectacle lens, is less than 1.

3. Spectacles comprising the plastic spectacle lens according to claim 2.

4. Spectacles comprising the plastic spectacle lens according to claim 1.

* * * * *